(12) United States Patent
Hohmann et al.

(10) Patent No.: US 7,513,178 B2
(45) Date of Patent: Apr. 7, 2009

(54) HYDRAULIC SCREW TIGHTENING OR TENSIONING DEVICE

(76) Inventors: Jörg Hohmann, Uhlandstrasse 6a, D-59872 Meschede (DE); Frank Hohmann, Josef-Menke-Strasse, D-59581 Warstein (DE)

( * ) Notice: Subject to any disclaimer, the term of this patent is extended or adjusted under 35 U.S.C. 154(b) by 0 days.

(21) Appl. No.: 11/574,710

(22) PCT Filed: Aug. 4, 2005

(86) PCT No.: PCT/EP2005/008458

§ 371 (c)(1), (2), (4) Date: Mar. 5, 2007

(87) PCT Pub. No.: WO2006/027061

PCT Pub. Date: Mar. 16, 2006

(65) Prior Publication Data

US 2008/0006122 A1    Jan. 10, 2008

(30) Foreign Application Priority Data

Sep. 3, 2004    (DE)    ........................ 10 2004 043 146

(51) Int. Cl.
*B25B 29/02* (2006.01)
*B25B 21/00* (2006.01)
(52) U.S. Cl. ..................................... 81/57.38; 81/57.14
(58) Field of Classification Search ................. 81/57.38, 81/57.14, 57.39, 429, 57.46, 57.31
See application file for complete search history.

(56) References Cited

U.S. PATENT DOCUMENTS

| | | | |
|---|---|---|---|
| 3,877,326 A | | 4/1975 | Kock et al. |
| 4,224,843 A | * | 9/1980 | Heiermann et al. ........ 81/57.38 |
| 4,273,011 A | * | 6/1981 | Exner et al. ................ 81/57.38 |
| 4,314,690 A | | 2/1982 | Mlynarik et al. |
| 4,565,111 A | | 1/1986 | Ecker et al. |
| 5,025,541 A | * | 6/1991 | Frizot ........................ 81/57.14 |
| 5,046,386 A | | 9/1991 | Frizot |
| 5,343,785 A | * | 9/1994 | Holt et al. .................. 81/57.38 |
| 5,452,629 A | * | 9/1995 | Heiermann et al. ........ 81/57.38 |
| 2004/0261583 A1 | | 12/2004 | Hohmann et al. |

FOREIGN PATENT DOCUMENTS

| | | |
|---|---|---|
| CH | 552 488 | 8/1974 |
| DE | 2 130 507 | 12/1972 |
| DE | A 23 28 444 | 1/1975 |

* cited by examiner

*Primary Examiner*—Hadi Shakeri
(74) *Attorney, Agent, or Firm*—Robert W. Becker; Robert W. Becker & Associates

(57) ABSTRACT

A hydraulic screw tensioning device for adjusting screws or bolts includes a cylinder supported on a machine part to be clamped by a threaded bolt and nut, at least one piston guided in the cylinder, a change sleeve threaded onto a threaded end of the bolt, a rotary sleeve in the cylinder for positive connection with the nut, first and second gear mechanisms for driving connection with the rotary sleeve and the change sleeve, respectively, a drive motor for the gear mechanisms, a connecting shaft between gears in the second gear mechanism and first gear mechanism, a device for alternative coupling of the drive motor with the change sleeve or the rotary sleeve, and respective recesses or extensions on a gear secured to the change sleeve and on the gear in the second gear mechanism to positively receive a tool for driving the connecting shaft.

8 Claims, 3 Drawing Sheets

HYDRAULIC SCREW TIGHTENING OR TENSIONING DEVICE

This specification for the instant application should be granted the priority date of Sep. 3, 2004, the filing date of the corresponding German patent application 10 2004 043 146.9 as well as the priority date of Aug. 4, 2005, the filing date of the corresponding International patent application PCT/EP2005/008458.

BACKGROUND OF THE INVENTION.

The present invention relates to a hydraulic screw tensioning device for the tightening and loosening of highly stressed screws or bolts, and includes a cylinder supported on a machine part that is to be clamped by a threaded bolt and a nut at least one piston that is guided in a sealed manner in the cylinder, is periodically supplied with pressure, and rests against a change sleeve threaded onto a threaded end of the threaded bolt, a pressure medium connection fitting on the screw tensioning device, and a rotary sleeve disposed in the cylinder and positively connected with the nut.

A screw tensioning device of this type is described in CH 552 448 A.

The object of such screw tensioning devices is to apply a precisely prescribed tensioning force onto a screw in order to be able to tighten or loosen the nut that is threaded onto the screw. For this purpose, the change sleeve in the screw tensioning device is threaded onto the projecting threaded end above the nut and thereafter the screw tensioning device is placed under hydraulic pressure. When the prescribed screw extension is achieved the nut that is threaded onto the threaded end of the threaded bolt is rotated along until it rests against the machine part.

To facilitate screwing-on of the change sleeve upon the threaded end of the threaded bolt with stationary screw tensioning cylinders, with the device of CH 552 448 A the pistons are provided at the top with a square or hexagonal extension. A turning tool, for example in the form of a manually operated "ratchet", can be placed on the square or hexagonal extension, and the piston, with the housing stationary, can be rotated and hence threaded onto or off of the threaded end. After the threaded bolt is clamped with the desired force, the nut is adjusted, with the aid of a tool through an opening in the cylinder, until it again rests fully against the machine part.

The time for tightening such highly stressed screws is dependent very greatly upon the secondary times, i.e. the threading of the change sleeve onto the threaded end of the threaded bolt as well as the adjustment of the nut.

It is an object of the present invention to shorten the secondary times during the use of a hydraulic screw tensioning device as much as possible, whereby this is to be achieved with the aid of a device that has as straightforward a construction as possible.

SUMMARY OF THE INVENTION

Proceeding from this object, the present invention, with a hydraulic screw tensioning device for tightening and loosening highly stressed screws or bolts and including a cylinder supported on a machine part that is to be clamped by a threaded bolt and a nut, at least one piston guided in a sealed manner in the cylinder, periodically supplied with pressure and resting against a change sleeve threaded onto a threaded end of the threaded bolt, a pressure medium connection fitting on the screw tensioning device, and a rotary sleeve disposed in the cylinder and positively connected with the nut, comprises a gear mechanism that is in driving connection with the rotary sleeve, a further gear mechanism that is in driving connection with the change sleeve, a drive motor for the gear mechanisms, a drive connection between the gear mechanism for the change sleeve and a gear mechanism for the rotary sleeve, and a device for the alternative coupling of the drive motor with the change sleeve or with the rotary sleeve.

The gear mechanisms can be constructed very simply with few gears, and only one drive motor is required for driving the change sleeve and the rotary sleeve; it can be alternatively coupled with the change sleeve or with the rotary sleeve since the change sleeve and the rotary sleeve are never rotated at the same time.

In a very simple manner, the switching means can comprise a gear that is displaceable from engagement with a gear that is in engagement with the change sleeve to a driving connection with the gear mechanism for the rotary sleeve. For this purpose, journal pins on the gear can be displaceably disposed preferably in slots in a lower and upper gear mechanism housing part, and the gear can be displaced by means of a fixable actuating lever.

If the drive motor is in driving connection with the gear mechanism for the change sleeve, a connecting shaft can be disposed between a gear in this gear mechanism and a gear in the gear mechanism for the rotary sleeve.

In order to also be able to thread the change sleeve onto the threaded end of the threaded bolt when no drive energy is available for the drive motor, or the torque of the drive motor is not adequate, the gear secured to the change sleeve, and the gear disposed in the gear mechanism, can be respectively provided with a hexagonal or square recess for the positive engagement of a turning tool for driving the connecting shaft.

This possibility is of interest if, although the hydraulic screw tensioning device can be placed into operation by means of a manually operated hydraulic pump there is no electrical connection available for the drive motor.

By means of an angle of rotation sensor connected with the drive motor, the thread length that is in engagement can be checked, and an indication regarding the extension of the threaded bolt after the tensioning can be provided without requiring special measurement devices.

This angle of rotation sensor can be installed on the drive motor or can be formed by the drive motor itself if the drive motor is embodied as a stepping motor that then simultaneously forms the angle of rotation sensor.

A motor switch is preferably disposed on the hydraulic screw tensioning device that also permits a switching from forward to reverse.

An automatic operation for the turning along of the nut is additionally possible; the drive motor is switched on by a remote control when the threaded bolt is rotated to a desired length. This is in particular important if, for example, all of the screws of a reactor pressure tank are to be simultaneously clamped by means of a corresponding number of screw tensioning devices. To prevent faulty switching, it is possible for example, to dispose a limit switch on the actuating lever or on the displaceable intermediate gear that permits the automatic operation only if the change sleeve is threaded entirely on, and the intermediate gear is released from the driving connection with the change sleeve.

The gear mechanism for the change sleeve, along with the drive motor and the connecting shaft are preferably embodied as an independent component that can be retrofitted on an existing screw tensioning device and that via a hexagonal or square extension can be coupled with the change sleeve, and via a corresponding hexagonal or square extension on the connecting shaft can be coupled with the gear mechanism for the rotary sleeve.

This structural component can be placed on any hydraulic screw tensioning device that has an appropriate hexagonal or square recess on the change sleeve as well as on the gear mechanism for the rotary sleeve. It is then merely necessary to provide bores for fastening screws on the existing screw tensioning device.

It is, of course, also possible to equip hydraulic screw tensioning devices right from the outset with the aforementioned structural unit which then has only a single drive motor that alternatingly can be coupled with a gear mechanism that is in engagement with the change sleeve and the rotary sleeve. In this case, a top that closes off the top of the screw tensioning device can be embodied directly as the gear mechanism housing that is then merely closed off by a straightforward cover.

The inventive screw tensioning device with the rotary drive for the change sleeve and the rotary sleeve can have a very compact construction and can also be inserted without difficulty where the space that is available is very limited.

BRIEF DESCRIPTION OF THE DRAWINGS

The invention will be described in detail with the aid of an embodiment illustrated in the drawings in which.

DESCRIPTION OF SPECIFIC EMBODIMENTS

Figure 1:
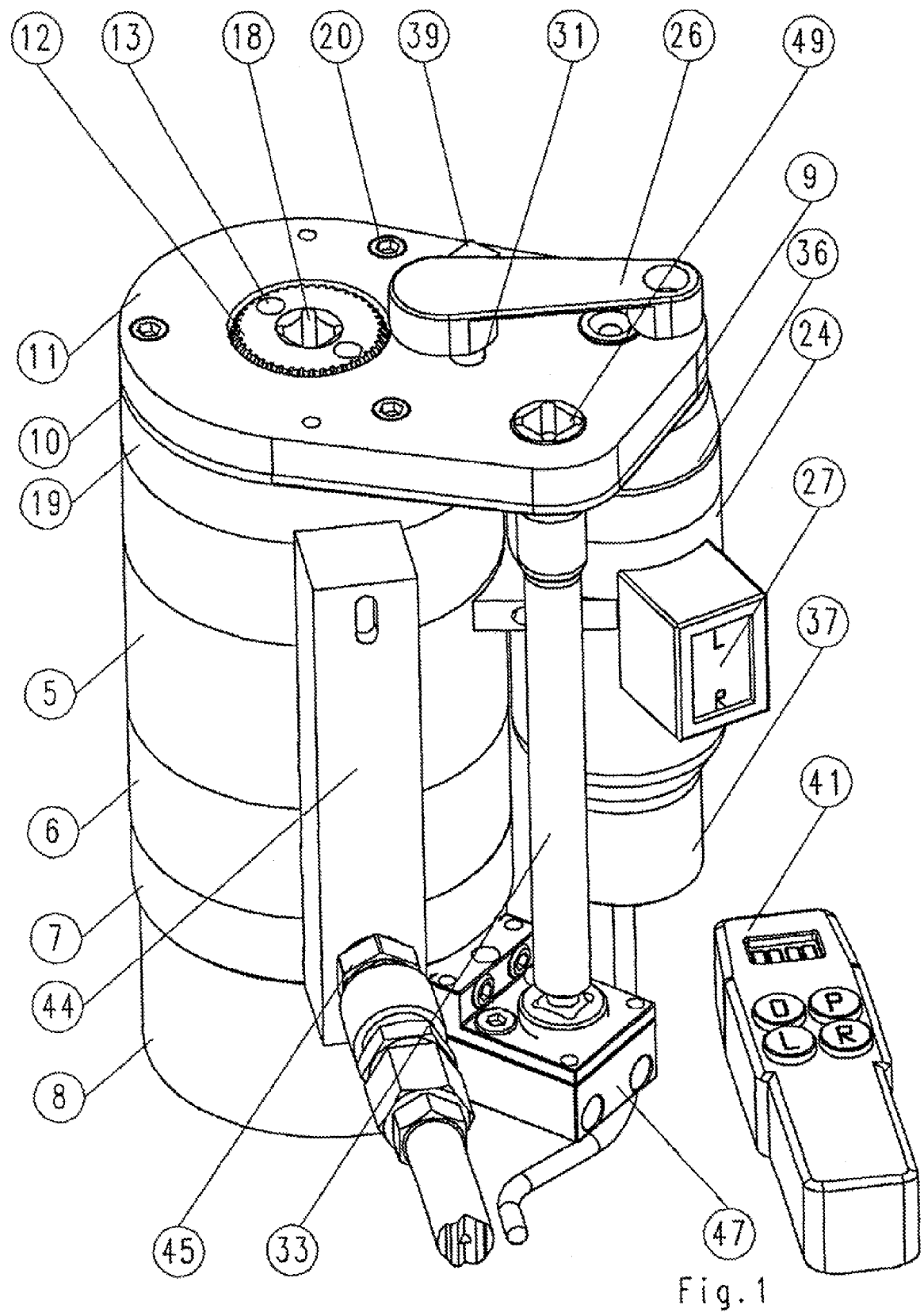
FIG. 1 shows a perspective illustration of hydraulic screw tensioning device having a drive unit for the change sleeve and the rotary sleeve.
Figure 2:
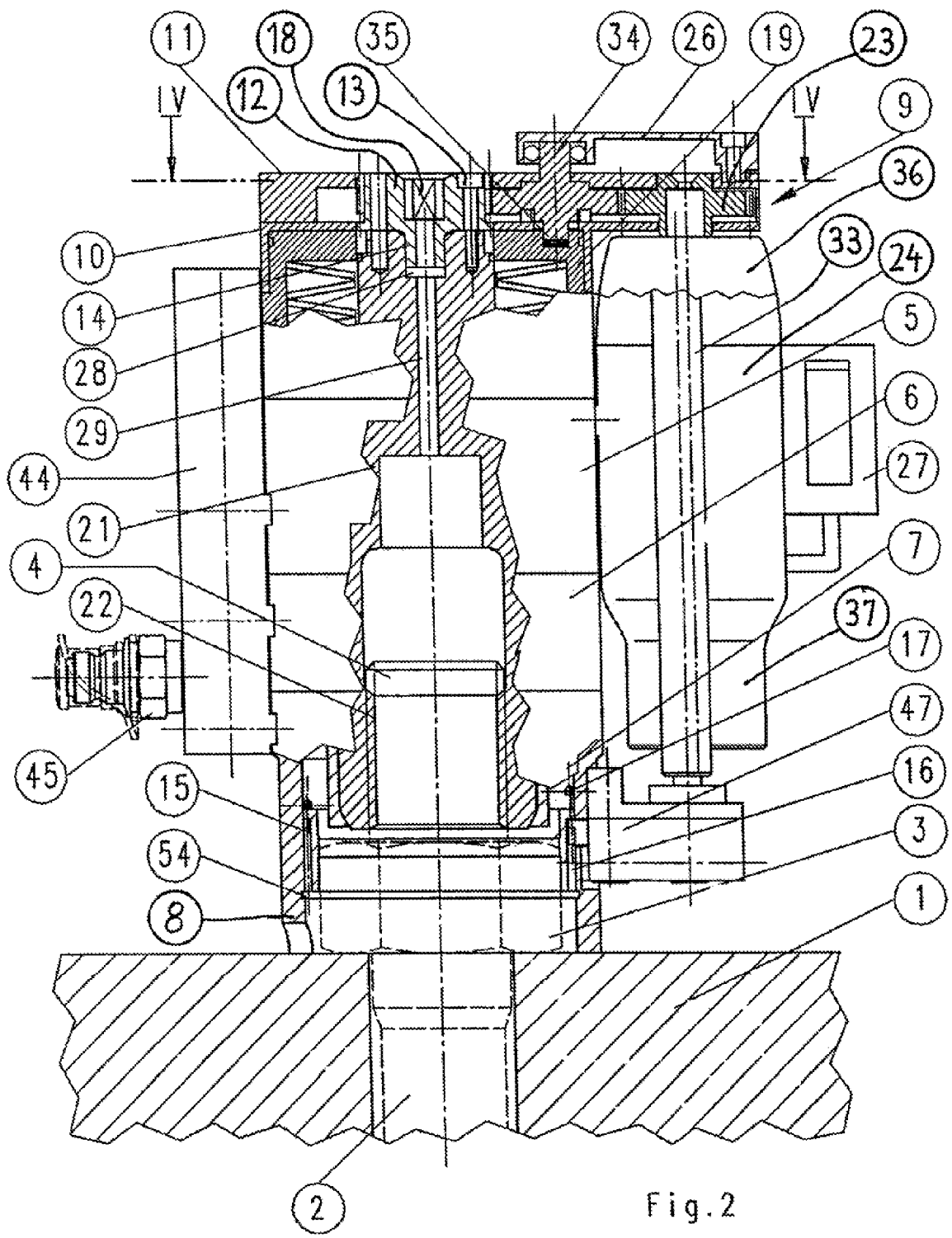
FIG. 2 is a side view, partially in cross section, of the hydraulic screw tensioning device of FIG. 1.
Figure 3:
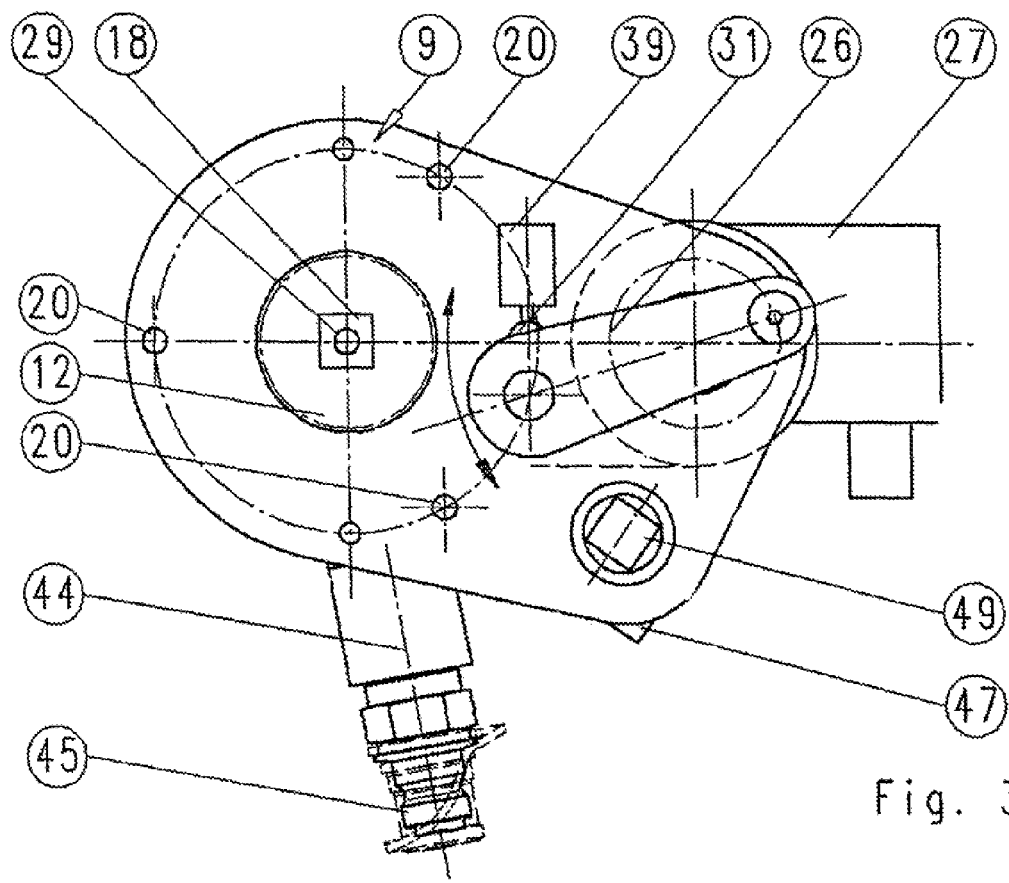
FIG. 3 is a top view onto the hydraulic screw tensioning device of FIGS. 1 and 2.

From the perspective, external view illustrated in FIG. 1, and from FIG. 2, shown is a hydraulic screw tensioning or tensioning device That is comprised of cylinder elements 5, 6, 7, a portion 8 that is supported on the machine part 1 that is to be clamped, and a top 19. Secured to the cylinder elements 5, 6, 7, in which hydraulic pistons move in a sealed manner, is a pressure medium distributor 44 that is provided with a connection fitting 45 for a high pressure hose. When pressure is supplied, a change sleeve 21 is moved upwardly by the non-illustrated hydraulic pistons.

Placed upon the top 19 is a gear mechanism 9, which has a lower housing part 10 and an upper housing part 11 and that is secured to the top 19 via screws 20.

The purpose of the hydraulic tensioning device is to tighten or clamp a machine part 1 by means of a threaded bolt 2 and a nut 3. For this purpose, the nut is first loosely threaded onto the threaded end 4 of the threaded bolt 2, whereupon a threaded portion 22 of the change sleeve 21 is threaded onto the threaded end 4, which still projects beyond the nut 3. Disposed in the portion 8 that is supported upon the machine part 1 is a rotary sleeve 15 that engages the nut 3 in a positive manner. The rotary sleeve 15 is protected from falling out of the portion 8 that is supported on the machine part 1 by means of a snap ring 54. A compression spring 17 exerts slight pressure onto the rotary sleeve 15 against the snap ring 54, as a result of which, when the hydraulic tensioning device is placed on, the rotary sleeve 15 can deflect axially if the hexagonal recess in the rotary sleeve 15 is not aligned with the external hexagon of the nut 3. Disposed on the rotary sleeve 15 is an external toothing 16 that cooperates with toothed gears in a gear mechanism 47.

The upper end of the change sleeve 21 is provided with a hexagonal or square recess 28 into which engages a hexagonal or square extension 14 on a gear 12 in the gear mechanism 9. This gear 12 is screw-connected with the change sleeve 21 by means of securement screws 13.

The gear 12, in turn, has a hexagonal or square recess 18 that merges with an axial bore 29 in the change sleeve 21.

Figure 4:
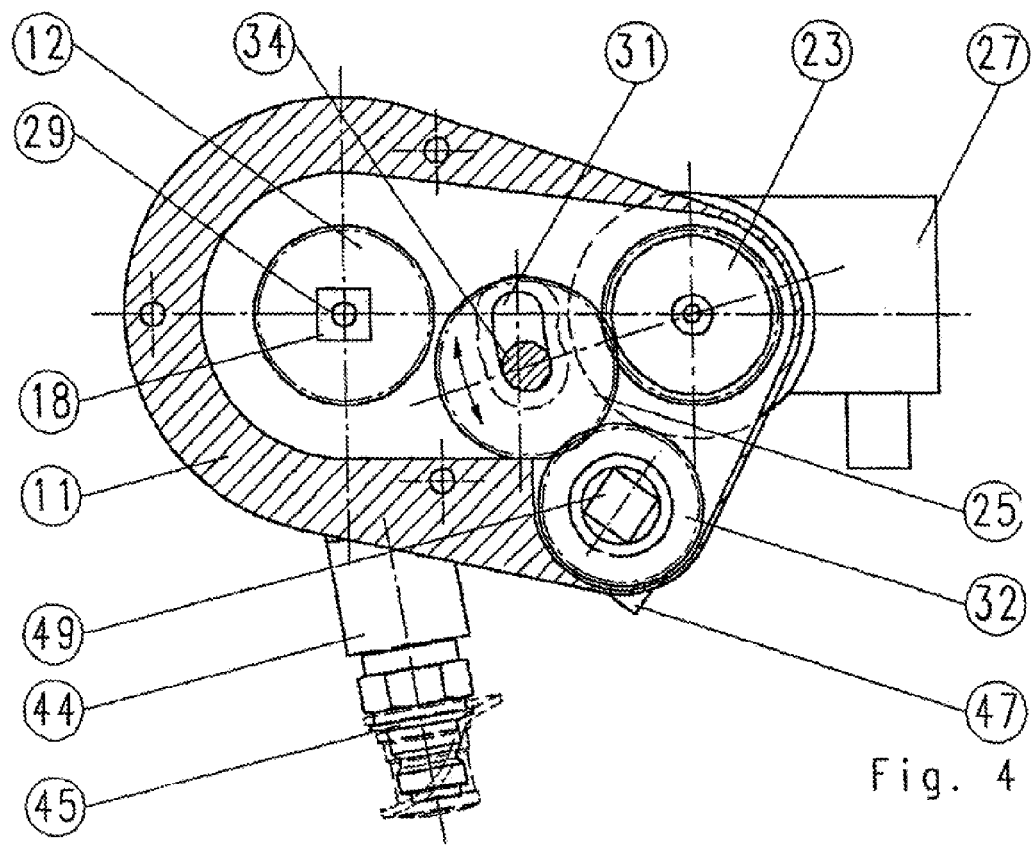
FIG. 4 is a top view in cross-section taken along the line IV-IV in FIG. 2.

Flanged onto the gear mechanism 9 is an electric drive motor 24, which is coupled with a gear 23. This gear 23 is in constant engagement with a displaceable intermediate gear 25, the shaft stubs or journal pins 34, 35 of which are guided in curved slots 31 in the lower part 10 of the gear mechanism housing and in the upper part 11 of the gear mechanism housing. This displaceable intermediate gear 25 can be shifted by means of an actuating lever 26 such that it is either in driving connection with a gear 32 in the gear mechanism 9, as illustrated in FIG. 4, or with the gear 12 that is connected with the change sleeve 21. A connecting shaft 33 is disposed between the gear 32 in the gear mechanism 9 and a gear in the gear mechanism 47 that is not shown in detail, so that the rotation of the electrical drive motor 24 is transferred, via the gear 32 the displaceable intermediate gear 25, and the connecting shaft 33, as well as via gears in the gear mechanism 47, onto the rotary sleeve 15, whereupon the nut 3 can in this manner be rotated.

If the displaceable intermediate gear 25 is brought into the engagement position with the gear 12, the change sleeve 21 can be threaded without a great expenditure of force by means of the electric drive motor 24 onto the threaded end 4 of the threaded bolt 2, with the cylinders 5, 6, 7 being stationary.

Just like the gear 12, the gear 32 in the gear mechanism 9 is also provided with a hexagonal or square recess 49, so that not only the change sleeve 21 but also the rotary sleeve 15 can be rotated by means of a manually operated turning tool if no electrical drive energy is available. The manually operated turning tool can also be used if the drive motor 24 fails or a difficulty of movement results between the nut 3 or the change sleeve 21 and the threaded bolt 2 that cannot be overcome by the drive motor 24 and that prevents threading on or off by means of the drive motor.

A motor switch 27 serves for turning the drive motor 24 on and off, as well as for undertaking switching between clockwise and counter clockwise rotation. In this way, not only the tightening but also the loosening of screws can be carried out with great speed and without large expenditure of force.

The motor switch 27 can be controlled by a remote control 41, which serves for turning the drive motor 24 on if the threaded bolt 2 is extended in order to rotate the nut 3 along with it. To prevent the drive motor 24 from being turned on while it is still in driving connection with the change sleeve 21, a limit switch 39 is disposed in the region of the actuating lever 26 that permits a connection for remote control only if the driving connection with the change sleeve 21 is interrupted.

A slip or release clutch 36 can be disposed between the drive motor 24 and the gear 23 to preclude damage to the gear mechanism components during overload. This release clutch 36 can also serve to tighten the nut 3 with a prescribed, low torque, and to rotate it along at this low torque during extension of the threaded bolt 2, without thereby influencing the screw extension.

An angle of rotation sensor 37 can be disposed on the drive motor 24. With the aid of the angle of rotation sensor 37 it is possible to check the thread length that is in engagement and to provide an indication regarding the extension of the threaded bolt 2.

If the drive motor 24 is embodied as an electrical stepping motor, it can also serve directly as an angle of rotation sensor or indicator.

The illustrated embodiment relates primarily to a retrofittable gear mechanism arrangement. With a screw tensioning device that is structurally equipped right from the beginning with the inventive drive 9, 24 for the change sleeve 21 and the rotary sleeve 15, the gear mechanism 9 can be disposed in the cover region of the top 19 and can be closed by a simple gear mechanism cover, without the need for providing an additional housing comprised of a lower part and an upper part.

The specification incorporates by reference the disclosure of German priority document 10 2004 043 146.9 filed Sep. 3, 2004 as well as PCT/EP2005/008458.

The present invention is, of course, in no way restricted to the specific disclosure of the specification and drawings, but also encompasses any modifications within the scope of the appended claims.

The invention claimed is:

1. A hydraulic screw tensioning device for tightening and loosening highly stressed screws or bolts having an elongate threaded end (4), comprising:
   a cylinder (5-8) adapted to be supported on a machine part (1) that is adapted to be clamped by a threaded bolt (2) and a nut (3) adapted to be threaded onto said threaded end (4);
   at least one piston that is guided in a sealed manner in said cylinder (5-8) and is adapted to be periodically supplied with pressure;
   a change sleeve (21) comprising a threaded portion (22) adapted to be threaded onto a threaded end (4) of said threaded bolt (2), wherein said at least one piston is adapted to rest against said change sleeve (21);
   a pressure medium connection fitting (45);
   a rotary sleeve (15) disposed in said cylinder (5-8) and adapted to be positively connected with said nut (3), wherein said nut is adapted to axially slide along said rotary sleeve (15);
   a first gear mechanism (47) adapted to be in driving connection (16) with said rotary sleeve (15);
   a second gear mechanism (9) adapted to be in driving connection with said change sleeve (21) at its end opposite from said threaded portion (22) remote from said first gear mechanism (47);
   a single drive motor (24) for said first and second gear mechanisms (47, 9);
   a connecting shaft (33) disposed between a gear (32) in said second gear mechanism (9) and a gear in said first gear mechanism (47);
   a device (25) for an alternative coupling of said drive motor (24) with said change sleeve (21) or with said rotary sleeve (15), wherein said device (25) for an alternative coupling comprises a gear (25) that is adapted to be displaced between engagement with said gear (12) secured to said change sleeve (21) and a driving connection with said first gear mechanism (47) for said rotary sleeve (15), and wherein journal pins (34, 35) are provided on said displaceable gear (25) and are displaceably disposed in slots (31) in a lower gear mechanism housing part (10) and an upper gear mechanism housing part (11); and
   respective hexagonal or square means (18, 49) on a gear (12) secured to said change sleeve (21) and on said gear (32) in said second gear mechanism (9) and adapted to positively receive a tool for driving said connecting shaft (33).

2. A hydraulic screw tensioning device according to claim 1, wherein a fixable actuating lever (26) is provided for displacement of said displaceable gear (25).

3. A hydraulic screw tensioning device according to claim 1, wherein an angle of rotation sensor (37) is connected with said drive motor (24).

4. A hydraulic screw tensioning device according to claim 1, wherein said drive motor (24) is embodied as a stepping motor and also forms an angle of rotation sensor (37).

5. A hydraulic screw tensioning device according to claim 1, which includes a motor switch (27), wherein said motor switch includes means for reversing a direction of rotation of said drive motor (24).

6. A hydraulic screw tensioning device according to claim 1, wherein said second gear mechanism (9) for said change sleeve (21), along with said drive motor (24) and said connecting shaft (33), are embodied as an independent structural unit that is adapted to be retrofitted on an existing screw tensioning device, wherein said structural unit is adapted to be coupled with said change sleeve (21) via a hexagonal or square means (14), and wherein said structural unit is adapted to be coupled to said first gear mechanism (47) for said rotary sleeve (15) via a comparable hexagonal or square means on said connecting shaft (33).

7. A hydraulic screw tensioning device according to claim 1, wherein a cap (19) that is adapted to close off said cylinder (5-8) toward the top is embodied as a gear mechanism housing for said second gear mechanism (9).

8. A hydraulic screw tensioning device according to claim 1, wherein a limit switch (39) is provided for sensing a position of said displaceable gear (25), and wherein said limit switch (39) permits a connection to a remote control (41) only upon interruption of a driving connection with said change sleeve (21).

* * * * *